(No Model.)
S. W. BARR.
SULKY PLOW.
No. 263,753. Patented Sept. 5, 1882.
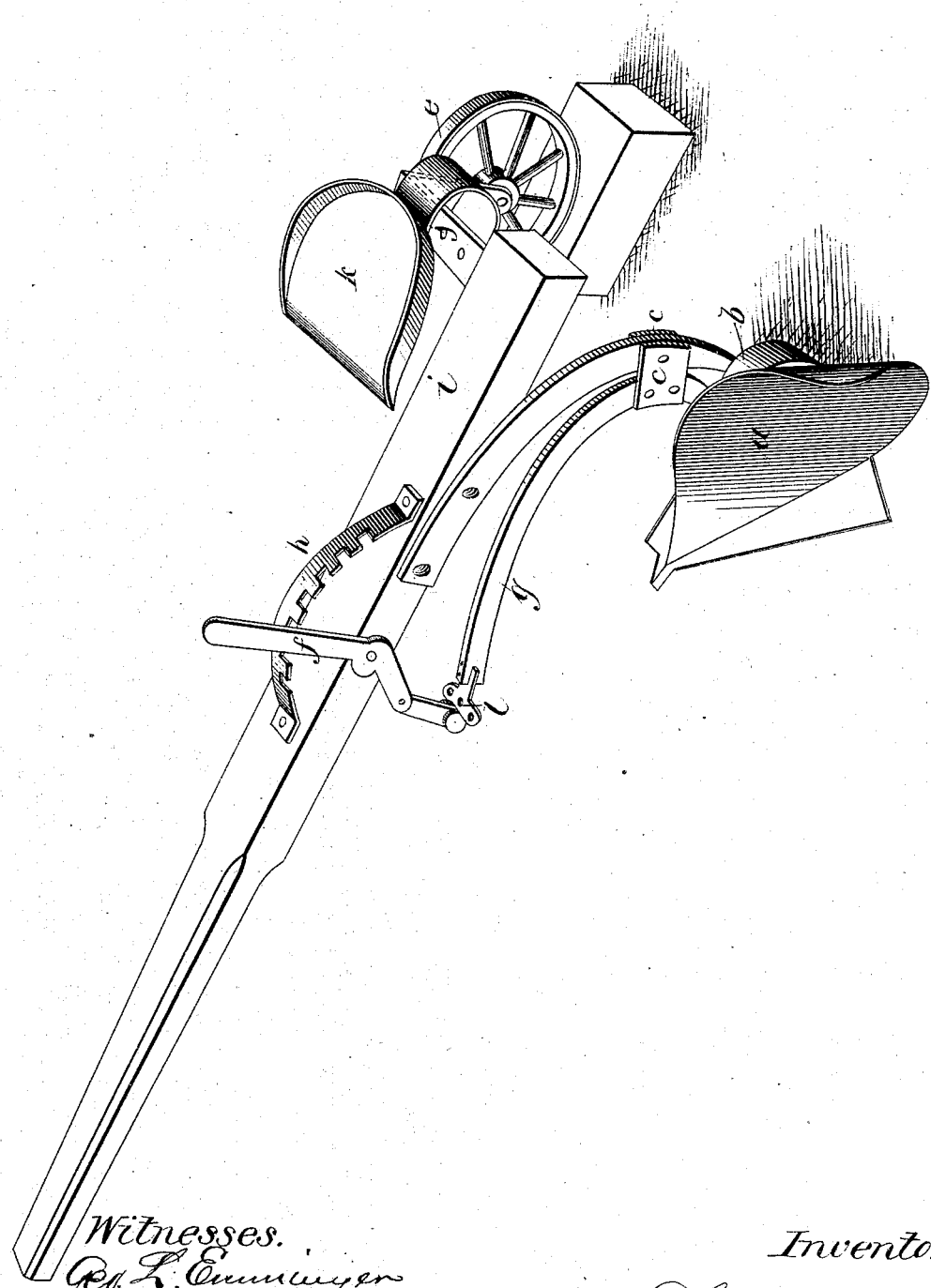
Witnesses.
Geo. L. Emminger
Stephen E. Balliet
Inventor:
Samuel W. Barr

UNITED STATES PATENT OFFICE.

SAMUEL W. BARR, OF MANSFIELD, OHIO.

SULKY-PLOW.

SPECIFICATION forming part of Letters Patent No. 263,753, dated September 5, 1882.

Application filed May 4, 1882. (No model.)

*To all whom it may concern:*

Be it known that I, SAMUEL W. BARR, of Mansfield, Richland county, Ohio, have invented a new and useful Improvement in Sulky-Plows, which improvement is fully set forth in the following specification, reference being had to the accompanying drawing.

My invention is designed to avoid much of the complication and expense of sulky-plows by running one wheel of the sulky in the furrow behind the plow, and in the construction of this machine a bar of iron three inches by three-fourths inch and about three feet long is bent upon one edge till the ends are at a right angle to each other. One end of this bar is drilled and a spindle riveted in at a right angle to the side of the bar for the small wheel $b$. The other end is bolted fast to a tongue of proper size, as at $d$. A plow provided with a flat bar or cast-iron beam, $g$, is placed in front of the small wheel $b$, with the quick curve of the beam $g$ within one inch of the bar $d$. Two iron plates, $c\ c$, six inches by eight broad and one-half inch thick, are placed on either side of the beam $g$ and bar $d$, exactly opposite, just above the mold-board $a$, and bolted to the beam $g$ with two bolts and to the bar $d$ with one. These plates form a coupling and prevent the plow from twisting to either side, and, being pivoted at the bolt through the bar $d$, allow the end of the beam $g$ to be raised or lowered by the lever $f$. The bracket $j$ is made of the same sized iron that $d$ is, and is cut three feet six inches long, and at a point ten inches from one end it is bent upon one side till the ends are at a right angle. The short end is drilled and a spindle riveted in for the wheel $e$. The other end is bolted fast to the tongue $i$. To this bracket the spring is bolted for the seat $k$.

I claim—

In combination with the tongue $i$, the curved bar $d$, the wheel $b$, bracket $j$, wheel $e$, pivoted plow-beam $g$, and lever $f$, substantially as shown and described.

SAMUEL W. BARR.

Witnesses:
MARCUS MCDERMOTT,
T. H. CARROLL.